(12) United States Patent
Homma et al.

(10) Patent No.: US 9,094,956 B2
(45) Date of Patent: Jul. 28, 2015

(54) WIRELESS COMMUNICATION TERMINAL AND OPERATING SYSTEM

(75) Inventors: Takeshi Homma, Saitama (JP); Norio Watarai, Saitama (JP); Hiroshi Shojima, Saitama (JP); Makoto Sugiyama, Saitama (JP)

(73) Assignee: CLARION CO., LTD., Saitama (JP)

( * ) Notice: Subject to any disclaimer, the term of this patent is extended or adjusted under 35 U.S.C. 154(b) by 0 days.

(21) Appl. No.: 14/110,394

(22) PCT Filed: Nov. 14, 2011

(86) PCT No.: PCT/JP2011/076183
§ 371 (c)(1),
(2), (4) Date: Nov. 8, 2013

(87) PCT Pub. No.: WO2012/137382
PCT Pub. Date: Oct. 11, 2012

(65) Prior Publication Data
US 2014/0057611 A1 Feb. 27, 2014

(30) Foreign Application Priority Data
Apr. 7, 2011 (JP) .................................. 2011-085359

(51) Int. Cl.
H04M 3/42 (2006.01)
H04W 76/04 (2009.01)
(Continued)

(52) U.S. Cl.
CPC ........... H04W 76/04 (2013.01); G01C 21/3682 (2013.01); H04M 3/493 (2013.01); H04M 1/72572 (2013.01); H04M 2242/15 (2013.01)

(58) Field of Classification Search
CPC . H04N 21/41407; H04N 5/445; H04N 21/47; H04N 21/4782; H04M 1/72522; H04M 1/72572; H04M 2203/254; H04M 3/42161; H04M 3/4938; H04M 1/271; H04W 4/02; H04W 4/027; H04W 4/025
USPC ......................................... 455/414.1
See application file for complete search history.

(56) References Cited

U.S. PATENT DOCUMENTS 5,564,070 A 10/1996 Want et al.
6,590,868 B2 * 7/2003 Shen ............................. 370/242
(Continued)

FOREIGN PATENT DOCUMENTS

JP 2005-094228 A 4/2005
JP 2007-251662 A 9/2007
(Continued)

OTHER PUBLICATIONS

Notification of Transmittal of Translation of the International Preliminary Report on Patentabililty (Form PCT/ IB/338) of International Application No. PCT/JP2011/076183 mailed Oct. 17, 2013 with Forms PCT/IB/373 and PCT/ISA/237.
(Continued)

Primary Examiner — Kwasi Karikari
(74) Attorney, Agent, or Firm — Westerman, Hattori, Daniels & Adrian, LLP

(57) ABSTRACT

A wireless communication terminal has input devices for inputting an operation content for operating an application, a communicator for transmitting the operation content input from the input devices to a server, and receiving a server processing result as a result of predetermined processing executed by the server, and a controller determining in accordance with the application as an operation target based on the operation content whether the operation based on the operation content input before interruption of the communication is continued after the communication with the server is recovered, when the communication with the server is interrupted after the operation content is input from the input means and before a server processing result corresponding to the operation content is received from the server.

18 Claims, 11 Drawing Sheets

(51) Int. Cl.
*G01C 21/36* (2006.01)
*H04M 3/493* (2006.01)
*H04M 1/725* (2006.01)

(56) References Cited

U.S. PATENT DOCUMENTS

| | | | | |
|---|---|---|---|---|
| 6,810,247 | B1* | 10/2004 | Halpern | 455/423 |
| 6,934,247 | B2* | 8/2005 | Bhattal et al. | 370/216 |
| 7,539,127 | B1* | 5/2009 | Shaffer et al. | 370/216 |
| 7,882,241 | B2* | 2/2011 | Tagane | 709/227 |
| 8,068,824 | B2* | 11/2011 | Shan et al. | 455/417 |
| 2002/0142802 | A1* | 10/2002 | Nagasawa et al. | 455/557 |
| 2006/0259305 | A1* | 11/2006 | Pietruszka | 704/275 |
| 2007/0178888 | A1* | 8/2007 | Alfano et al. | 455/414.1 |
| 2008/0081627 | A1 | 4/2008 | Shan et al. | |
| 2009/0315766 | A1 | 12/2009 | Khosravy et al. | |

FOREIGN PATENT DOCUMENTS

| | | |
|---|---|---|
| JP | 2008-128799 A | 6/2008 |
| JP | 101493331 A | 7/2009 |
| JP | 2009-175233 A | 8/2009 |
| JP | 2011-038925 A | 2/2011 |
| JP | 2011-059313 A | 3/2011 |
| WO | 2011/030817 A1 | 3/2011 |

OTHER PUBLICATIONS

International Search Report dated Feb. 14, 2012, issued in corresponding application No. PCT/JP2011/076183.
Extended European Search Report dated Sep. 16, 2014, issued in corresponding EP application No. 11863054.0.
Office Action dated Dec. 25, 2014, issued in corresponding Chinese Patent Application No. 201180069837.6, (7 pages).

* cited by examiner

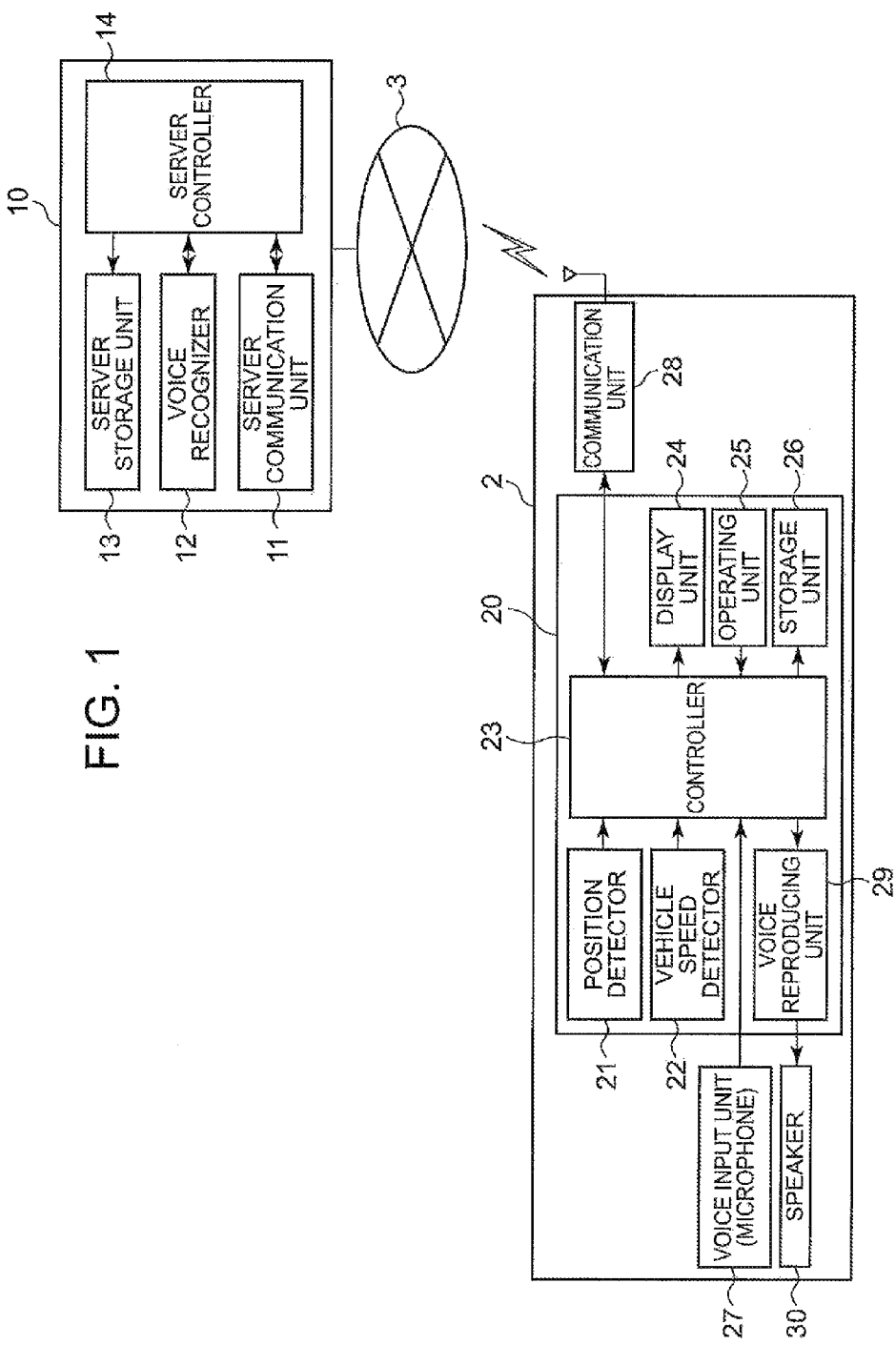

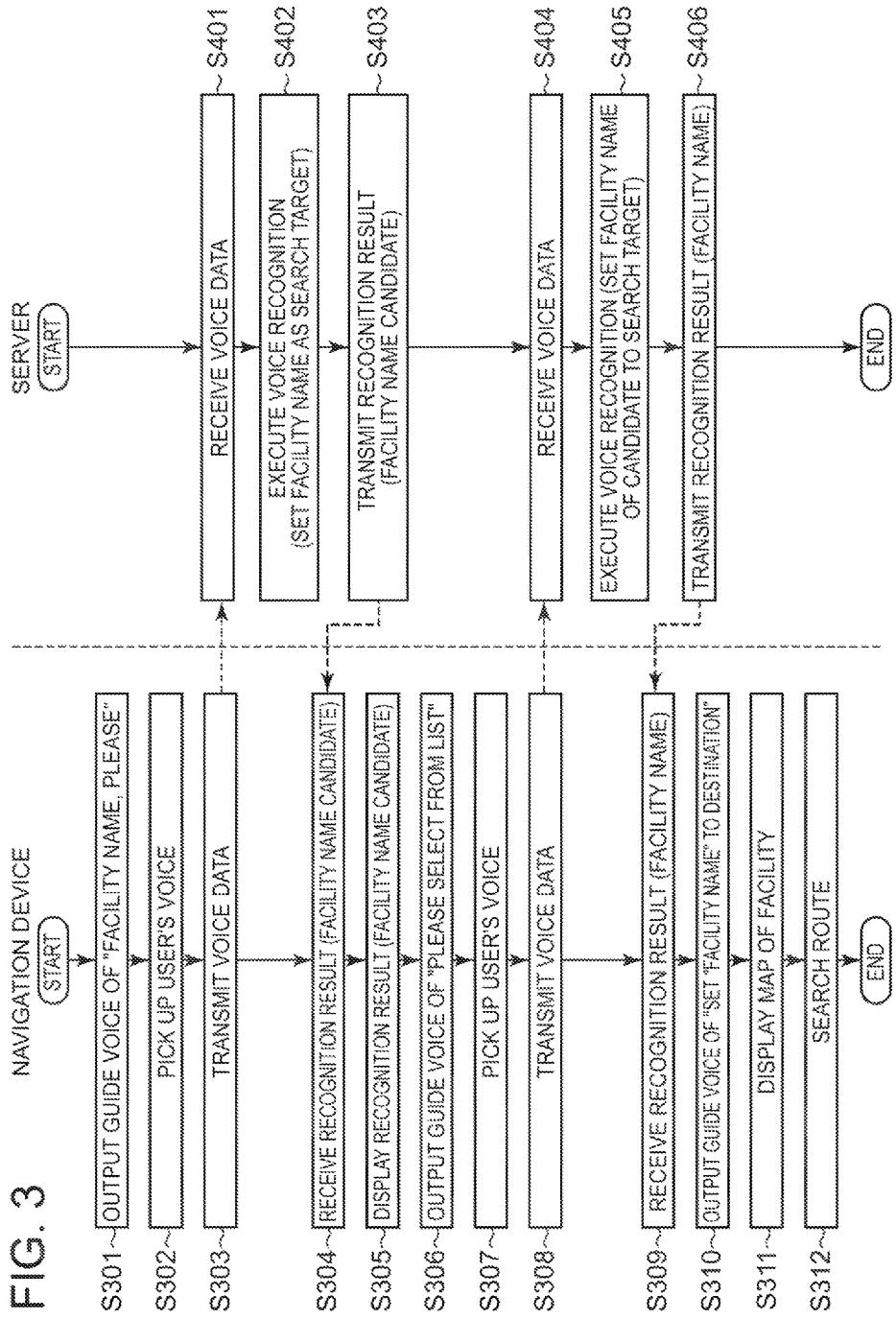

| APPLICATION | | CONTINUATION CONDITION | CONTINUATION/CESSATION | PROCESSING AFTER RECOVERY OF COMMUNICATION |
|---|---|---|---|---|
| DEVICE OPERATION | | INTERRUPTION < PREDETERMINED TIME | CONTINUATION | NORMAL CONTINUATION |
| | | INTERRUPTION ≥ PREDETERMINED TIME | CESSATION | - |
| MUSIC SEARCH OPERATION | | INTERRUPTION < PREDETERMINED TIME | CONTINUATION | NORMAL CONTINUATION |
| | | INTERRUPTION ≥ PREDETERMINED TIME | CESSATION | - |
| FACILITY SEARCH OPERATION | | - | CONTINUATION | SEE (B) |

| APPLICATION | CLASSIFICATION | CONDITION | PROCESSING AFTER RECOVERY OF COMMUNICATION |
|---|---|---|---|
| FACILITY SEARCH OPERATION | NEIGHBORING FACILITY SEARCH | TRAVEL DISTANCE > PREDETERMINED DISTANCE | RE-SEARCH FACILITIES AT SELF POSITION AFTER RECOVERY OF COMMUNICATION |
| | | TRAVEL DISTANCE ≤ PREDETERMINED DISTANCE | NORMAL CONTINUATION |
| | DISTRICT-LIMITED FACILITY SEARCH | PROVINCE AT SELF POSITION VARIES | RE-SEARCH FACILITIES AT SELF POSITION AFTER RECOVERY OF COMMUNICATION |
| | | PROVINCE AT SELF POSITION IS UNCHANGED | NORMAL CONTINUATION |
| | SPECIFIC FACILITY SEARCH | - | NORMAL CONTINUATION |

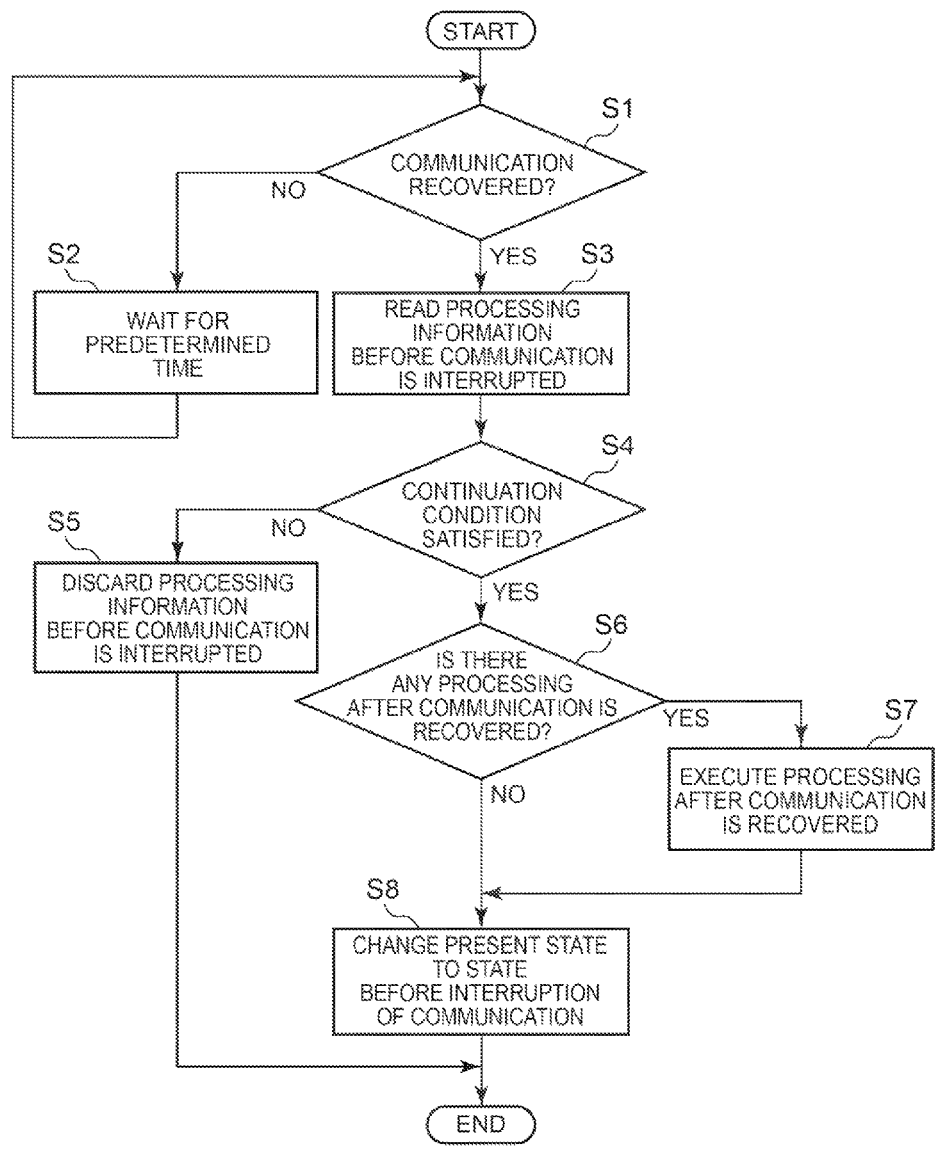

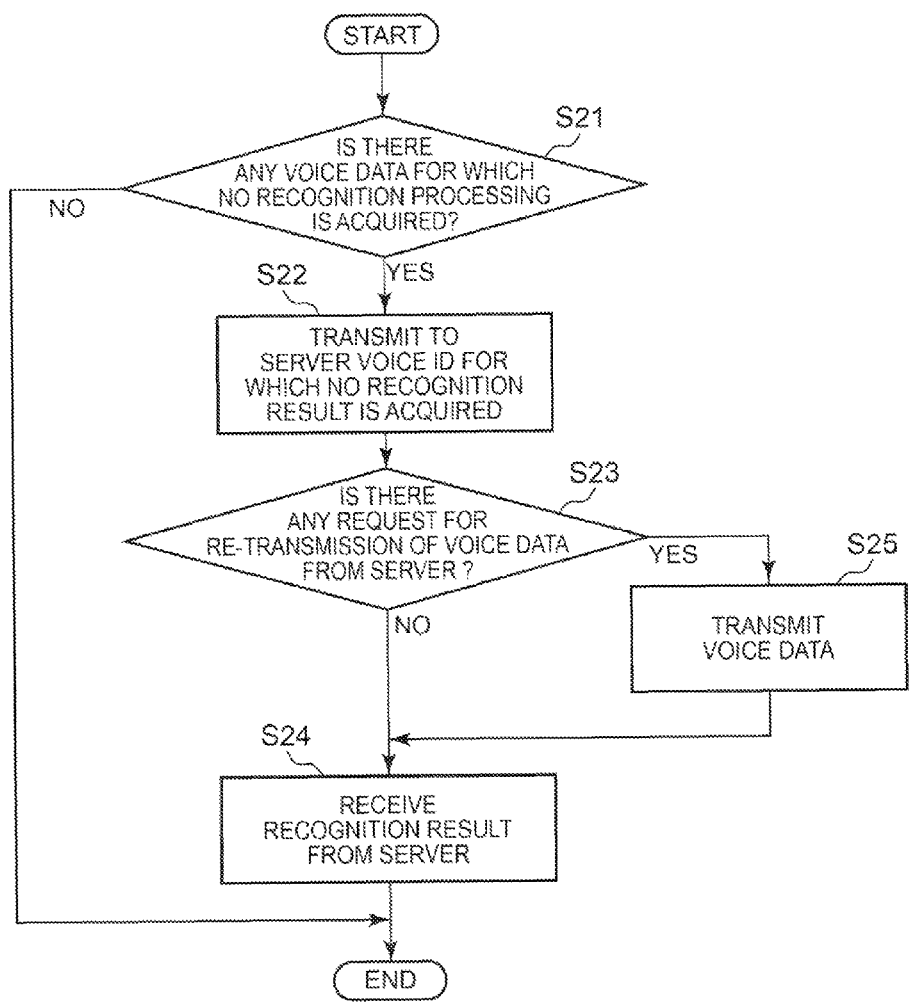

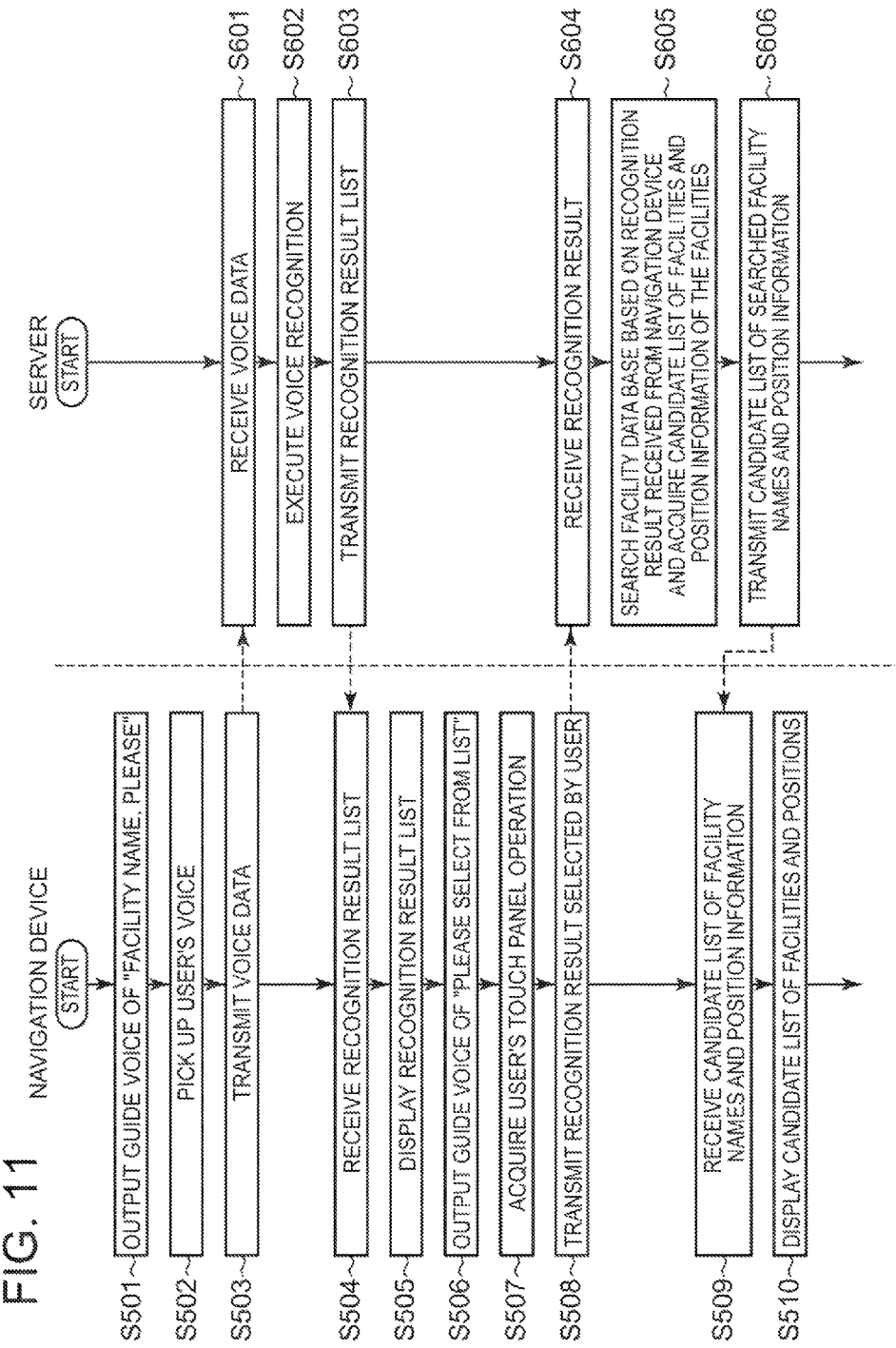

WIRELESS COMMUNICATION TERMINAL AND OPERATING SYSTEM

TECHNICAL FIELD

The present invention relates to a wireless communication terminal and an operating system that operate an application.

BACKGROUND ART

The following wireless communication terminal such as cellular phone or the like has been hitherto known. That is, in a case where the terminal enters a tunnel or the like during a call and the communication is interrupted, the terminal automatically emits a calling signal to a communication partner with which the terminal communicated before the interruption when the terminal thereafter moves to a communication-possible environment, or does not emit a calling signal to the communication partner when the communication has been impossible for a predetermined time since the interruption of the communication (see patent document 1, for example).

PRIOR ART DOCUMENT

Patent Document 1: JP-A-2007-251662

SUMMARY OF THE INVENTION

Problem to be Solved by the Invention

However, in the above construction, it is merely determined whether the communication is continued (a call is made) after the communication is recovered.

For example, with respect to a wireless communication terminal for operating an application with voices, when voice recognition is performed at a server side, there is a requirement that it is determined according to an application whether an operation of the application before interruption of the communication with the server is continued after the communication with the server is recovered.

The present invention has been implemented in view of the foregoing situation, and has an object to provide a wireless communication terminal and an operating system that determine according to an application whether an operation of the application before interruption of communication is continued after the communication is recovered.

Means of Solving the Problem

In order to attain the above object, according to the present invention, a wireless communication terminal according to the present invention is characterized by comprising: input means that inputs an operation content for operating an application; communication means that transmits the operation content input from the input means to a server, and receives a server processing result as a result of predetermined processing executed by the server; and control means that determines, in accordance with an application as an operation target based on the operation content, whether an operation based on the operation content input before communication with the server is interrupted should be continued after the communication with the server is recovered, when the communication with the server is interrupted after the operation content is input from the input means and before a server processing result corresponding to the operation content is received from the server.

In the above construction, when the application is a periphery search at a present position and the operation is an input operation of search words, the periphery search may be executed while a position after the recovery of the communication is set to the present position.

In the above construction, the operation content may be a voice.

In the above construction, the predetermined processing may be voice recognition processing for executing voice recognition on the voice.

Furthermore, according to the present invention, an operation system having a server for executing predetermined processing, and a wireless communication terminal that transmits an operation content for operating an application to the server, receives a server processing result as a result of predetermined processing executed by the server and executes processing corresponding to the operation, is characterized in that when the communication with the server is interrupted after the operation content is input and before a server processing result corresponding to the operation content is received from the server, the wireless communication terminal determines, in accordance with an application as an operation target based on the operation content, whether an operation based on the operation content input before communication with the server is interrupted is continued after the communication with the server is recovered.

In the above construction, when the communication with the wireless communication terminal is interrupted before transmission of a recognition result of the voice to the wireless communication terminal is completed, the server may determine on the basis of the server processing result whether the operation content is an operation content for operating an application to be continued after the recovery of the communication, and hold or delete a server processing result corresponding to the operation content in accordance with the determination result.

In the above construction, the operation content may be a voice.

In the above construction, the predetermined processing may be voice recognition processing for executing voice recognition on the voice.

In the above construction, the predetermined processing may be a data base search for searching data corresponding to the operation content from a data base.

All the content of Japanese Patent Application No. 2011-85359 filed on Apr. 7, 2011 is contained in this specification.

Effect of the Invention

According to the present invention, whether an operation based on an operation content input before communication is interrupted should be continued after the communication with a server is recovered can be determined in accordance with an application as an operation target based on the operation content.

BRIEF DESCRIPTION OF THE DRAWINGS

FIG. 1 is a block diagram showing the functional construction of a voice operating system according to an embodiment of the present invention.

FIG. 2 is a diagram showing an voice information managing table, wherein

FIG. 3 is a flowchart showing a facility search operation application when voice recognition at the server is performed at plural times.

FIG. 4 is a diagram showing a continuation determining table, wherein FIG. 4(A) is a diagram showing a table containing a continuation condition, and FIG. 4(B) is a diagram showing a table containing post-continuation processing of the facility search operation application.

FIG. 5 is a flowchart showing communication recovery processing.

FIG. 10 is a flowchart showing recognition result acquisition check processing.

FIG. 11 is a flowchart showing the operation of the facility search operation application when not only voice recognition, but also facility search is performed at the server.

MODE FOR CARRYING OUT THE INVENTION

Figure 2A:
FIG. 2(A) is a diagram showing a voice information managing table of a navigation device.

An embodiment according to the present invention will be described hereunder with reference to the drawings. In the following description, an in-vehicle mount type navigation device mounted in a vehicle (a so-called car navigation device) will be typically described as a wireless communication terminal. A voice operating system for operating an application with voices will be typically described as an operating system.

FIG. 1 is a block diagram showing the functional block of a voice operating system according to an embodiment.

The voice operating system has a server 10 and a navigation device 20 mounted in a vehicle 2, and the server 10 and the navigation device 20 can be mutually communicated with each other through a network 3 such as the Internet or the like.

The server 10 has a server communication unit 11, a voice recognizer 12, a server storage unit 13, and a server controller 14. The server communication unit 11 receives audio data from a navigation device 20 and outputs the audio data to the server controller under the control of the server controller 14. Under the control of the server controller 14, the voice recognizer executes voice recognition processing (predetermined processing) on the audio data received from the server communication unit 11, and outputs a recognition result (server processing result) to the server controller 14. Under the control of the server controller 14, the audio data stored from the navigation device 20, the recognition result output from the voice recognizer 12, etc. are stored in the server storage unit 13. The server communication unit 11 transmits the recognition result to the navigation result to the navigation device 20.

The navigation device 20 has a position detector 21, a vehicle speed detector 22, a controller (control means) 23, a display unit 24, an operating unit (input means) 25, a storage unit 26, a voice input unit (input means) 27, a communication unit (communication means) 28, an audio reproducing unit 29 and a speaker 30.

The position detector 21 detects the absolute position (longitude, latitude) of the present position by utilizing GPS (Global Positioning System), for example, and detects the relative azimuth direction of the present position by using a gyro sensor or the like. The vehicle speed detector 22 processes vehicle speed pulses obtained from a vehicle 2 and outputs the speed of the vehicle 2 to the controller 23.

The controller 23 executes various kinds of processing such as control processing of each part of the navigation device 20, processing for the navigation function, processing for music reproducing function, etc., and has CPU, ROM, RAM, etc., for example.

Under the control of the controller 23, the display unit 24 displays an operation screen of the navigation device 20, a navigation screen representing a map, a present position, a route, etc. for navigation and various kinds of information such as a music reproduction screen for reproducing music, etc., and it has a display device such as LCD (Liquid Crystal Display), EL (Electro Luminescent) device or the like. The operating unit 25 has plural operators which accept an instructing operation of a user such as a driver or the like and are disposed in the navigation device 20, a touch panel (not shown) provided to the display device of the display unit 24. The operating unit 25 may be configured so that the navigation device 20 can be remotely controlled by a remote controller or the like.

The storage unit 26 is a storage device such as a CD-ROM drive, a DVD-ROM drive, a hard disc drive, an SD card, SSD (Solid State Drive) or the like, and under the control of the controller 23, the storage unit 26 stores various kinds of data such as map data used for navigation, facility data containing the places of facilities, guide audio data such as route guide, music data reproduced when music is reproduced, etc.

The voice input unit 27 is configured to contain a microphone for receiving user's voices, for example, and outputs user's audio data to the controller 23. In this embodiment, when a talk switch (which is also called as an utterance button) (not shown) provided to the operating unit 25 is operated, voice input to the controller 23 is allowed. Under the control of the controller 23, the communication unit 28 communicates with the server 10 through the network 3 to transmit audio data to the server 10 and receive a recognition result of audio data from the server 10. The audio reproducing unit 29 subjects guide voice data and music data to various kinds of processing required for reproduction such as decode processing, etc. to generate digital audio signal, executes digital-to-analog conversion on the generated digital audio signal, amplifies the analog audio signal by using an amplifier, and outputs sounds from the speaker 30.

According to the above construction, when user's voices are input to the voice input unit 27, the controller 23 allocates voice ID to each voice data input from the voice input unit 27, and transmits the voice ID to the server 10 together with the voice data. In the server 10, voice recognition processing is executed on the input voice data by the voice recognizer 12, and transmits the recognition result and the voice ID to the navigation device 20. Accordingly, the voice data and the recognition result thereof are managed on the basis of the common voice ID in the navigation device 20 and the server 10. Voice information managing tables 31, 32 (see FIG. 2) for managing the voice data are stored in the storage unit 26 of the navigation device 20 and the server storage unit 13 of the server 10, respectively.

Figure 2B:
FIG. 2(B) is a diagram showing a voice information managing table of a server.

FIG. 2 are diagrams showing the voice information managing tables 31, 32, wherein FIG. 2(A) is a diagram showing the voice information managing table 31 of the navigation device 20, and FIG. 2(B) is a diagram showing the voice information managing table 32 of the server 10.

As shown in FIG. 2(A), the voice ID, the voice data (voice file) input from the voice input unit 27 and the recognition result of the voice data received from the server 10 are stored in the form of a list in the voice information managing table 31 of the navigation device 20.

As shown in FIG. 2(B), the voice ID and the voice data (voice file) received from the navigation device 20 and the recognition result of the voice data input from the voice recognizer 12 are stored in the form of a list in the voice information managing table 32 of the server 10.

In the example of FIG. 2, with respect to voice data of voice IDs 4, 5, the navigation device 20 has not yet obtained the recognition results thereof.

The controller 23 operates the navigation device 20 in a music reproducing mode or a navigation mode.

In the case of the music reproducing mode, the controller 23 displays various kinds of screens for music reproducing operation, and reproduces music data in the storage unit 26 according to a user's instruction.

In the case of the navigation mode, the controller 23 specifies the present place and travel direction of the vehicle by the position detector 21, and displays a map around the present place on the display unit 24. When a destination is set, the controller 23 calculates an optimum route to the destination and displays the optimum route on the map to perform route guide until the destination.

The navigation device 20 of this embodiment has, as applications operated with voices, a music search operation application for searching music pieces in the music reproducing mode, a facility search (periphery search) operation application for searching surrounding facilities or searching a facility as a destination in the navigation mode, and a device operating application for operating the navigation device 20 with voices in other cases than the music search operation application and the facility search operation application.

The communication between the server 10 and the navigation device 20 in this embodiment is not limited to a case where only one communication is executed and finished by one-shot operation, but it may be extended to a case where plural communications are executed by one-shot operation.

A specific communication flow will be described on the basis of the operation of the facility search operation application as an example.

FIG. 3 is a flowchart showing the operation of the facility search operation application when voice recognition is executed at plural times in the server 10 until a facility name is determined.

First, in the navigation device 20, the controller 23 reproduce a guide voice or display a screen to promote a user's utterance (step S301). When voices uttered by the user are taken from the voice input unit 27 (step S302), the controller 23 transmits the thus-taken voice data to the server 10 (step S303).

In the server 10, when the voice data transmitted from the navigation device 20 is first received (step S401), the server controller 14 executes voice recognition on the voice data to convert the voice data to a character string (step S402). Here, vocabulary as a voice recognition target is limited to a facility name. Furthermore, erroneous recognition may occur in the voice recognition. Therefore, according to this embodiment, plural facility names are obtained as a recognition result, and a user is made to select a facility name from these candidates. The server controller 14 transmits a list of the facility name candidates as the recognition result to the navigation device 20 (step S403).

In the navigation device 20, when the list of the facility name candidates is received (step S304), the controller 23 displays the list of the facility name candidates (step S305), the controller 23 reproduces a guide voice to promotes a user to select a desired facility name (step S306). This select is performed through voice recognition, but it may be performed by a manual operation using a touch panel or the like. Furthermore, there may be prepared means for displaying a cancel button or the like on the screen so that the user is made to correct. When voices uttered by the user are taken in (step S307), the controller 23 transmits the thus-taken voice data to the server 10 (step S308).

In the server 10, when the voice data is received (step S404), the server controller 14 executes the voice recognition on this voice data (step S405). Here, vocabulary as a voice recognition target is limited to the list of the facility name candidates transmitted in step S403. The number of the facility name list and words for correction ("cancel") may be set as recognition targets. The server controller 14 transmits the facility name obtained as the recognition result to the navigation device 20 (step S406).

In the navigation device 20, when the facility name is received (step S309), the controller 23 executes voice output (step S310), screen output (step S311) and route search (step S312) so as to set this facility name as a destination.

In the example of FIG. 3, the voice recognition is executed twice in the server 10, and communication also occurs twice. In this embodiment, in the application operation accompanied with a series of these communications, the communication can be recovered with keeping excellent usability even when the communication is halfway interrupted.

When the communication with the server 10 is interrupted before the operation of the application is completed, the controller 23 executes communication recovery processing of determining according to the application as the operation target whether the operation before the communication is interrupted is continued after the communication is recovered. In the communication recovery processing, the controller 23 refers to a continuation determining table TB (see FIG. 4) stored every application to determine whether the operation is continued after the communication is recovered. The continuation determining table TB is stored in the storage unit 26.

FIG. 4 is a diagram showing the continuation determining table TB, wherein FIG. 4(A) is a diagram showing a table TB1 containing a continuation condition, and FIG. 4(B) is a diagram showing a table TB2 containing processing after the facility search operation application is continued.

In the device operation application, the controller 23 determines whether the communication interruption time is less than a predetermined time or not. When the communication interruption time is less than the predetermined time, the controller 23 continues the operation of the device operation application just before the communication is interrupted. On the other hand, when the communication interruption time is not less than the predetermined time, the controller 23 stops the device operation application.

In the music search operation application, the controller 23 determines whether the communication interruption time is less than a predetermined time. When the communication interruption time is less than the predetermined time, the controller 23 continues the operation of the music search operation application just before the communication is interrupted. On the other hand, when the communication interruption time is not less than the predetermined time, the controller 23 stops the operation of the music search operation application.

In the facility search operation application, the controller 23 continues the operation of the facility search operation application irrespective of the communication interruption time. Furthermore, the controller 23 functions as search word classifying means for classifying search words on the basis of the recognition result received from the server 10. More specifically, when the search words represent a category of facilities such as Rahmen shop, a convenience store or the like, when the search words contain a word(s) intending a neighborhood such as "near to", "on a route" or the like, and/or when the hit count of facilities is large (equal to or more than a predetermined number of hits), the controller 23 classifies the search as a search for neighboring facilities.

Furthermore, when the search words represent facilities (for example, a court of law, an administrative institution or the like) installed in a province such as a country, a prefecture, a state, a city, a town, a village or the like, the controller 23 classifies the search as a search for district-limited facilities.

Furthermore, when the hit count of facilities is small (less than the predetermined number of hits) and/or the hit count f the facilities is concentrated on a specific district, the controller 23 classifies the search as a search for specific facilities.

The classifying method of the facility search is not limited to the above method. For example, in the facility search operation application, the following method may be used. That is, a menu screen which a user can operate is prepared, and items such as "search based on facility names", "search based on neighboring facilities", "search based on category name", etc. are prepared. When the user selects the "search based on facility names" for a search, the search is classified as the specific facility search. When the user selects the "search based on neighboring facilities" for search, the search is classified as the neighboring facility search. Furthermore, when the user selects the "search based on category name" and then the user specifies a category such as a court of law, an administrative institution or the like, the search may be classified as the district-limited facility search.

In the case of the neighboring facility search, the controller 23 determines whether the travel distance from the time when the communication has been interrupted is longer than a predetermined distance. When the travel distance is longer than the predetermined distance, the controller 23 re-searches facilities at the present position after the communication is recovered. When the travel distance is not longer than the predetermined distance, the controller 23 continues the operation of the device operation application before the interruption of the communication without change.

In the case of the district-limited facility search, the controller 23 determines whether the province at the present position varies or not since the interruption of the communication. When the province at the present position varies, the controller 23 re-search facilities on the basis of the province at the present position after the communication is recovered. When the province at the present position is unchanged, the controller 23 continues the operation of the device operation application before the interruption of the communication without change.

In the case of the specific facility search, the controller 23 continues the operation of the device operation application before the interruption of the communication irrespective of the present position.

Subsequently, the process of the communication recovery processing will be described. FIG. 5 is a flowchart showing the communication recovery processing.

As described above, the communication recovery processing is executed by the controller 23 when the communication with the server 10 is interrupted. The controller 23 first determines whether the communication with the server 10 is recovered or not (step S1).

When the communication is not recovered (step S1: No), the controller 23 waits for a predetermined time (step S2), and shifts the processing to step S1.

When the communication is recovered (step S1: Yes), the controller 23 reads processing information before the interruption of the communication (step S3). Here, the processing information is the type of an application as an operation target before the interruption of the communication, voice data and the recognition result thereof.

Subsequently, the controller 23 refers to the continuation determination table TB, and determines whether a condition for continuing the operation of the application is satisfied or not (step S4). In this embodiment, the controller 23 determines whether the application is a device operation application and the interruption time of the communication is less than a predetermined time or not, whether the application is a music search operation application and the interruption time of the communication is less than the predetermined time or not, and whether the application is a facility search operation application or not.

When the condition for continuing the operation of the application is not satisfied (step S4: No), the controller 23 stops the operation of the application, discards the processing information before the recovery of the communication (step S5) and finishes the processing.

When the condition for continuing the operation of the application is satisfied (step S4: Yes), the controller 23 determines whether there is any necessary processing after the recovery of the communication (step S6). In this embodiment, the case where there is some necessary processing after the recovery of the communication means a case where the classification of the search in the facility search operation application is the neighboring facility search and the travel distance is longer than a predetermined distance or a case where the classification of the search is the district-limited facility search and the province at the present position varies.

When there is some processing before the recovery of the communication (step S6: Yes), the controller 23 executes the necessary processing after the recovery of the communication (step S7). In this embodiment, when the search is the neighboring facility search and the travel distance during the interruption of the communication is longer than a predetermined distance, the controller 23 re-searches facilities on the basis of the province at the present position after the recovery of the communication. When the search is the district-limited facility search and the province at the present position varies during the interruption of the communication, the controller 23 re-searches facilities on the basis of the province at the present position after the recovery of the communication.

When there is no necessary processing after the recovery of the communication (step S6: No), the controller 23 changes the present state of the application operation to the state before the interruption of the communication (step S8), and then finishes the processing.

As described above, through the communication recovery processing, it can be determined whether the operation input before the interruption of the communication is continued after the communication with the server 10 is recovered.

Next, a specific operation of an application will be described by using a facility search operation application as an example.

Figure 6:
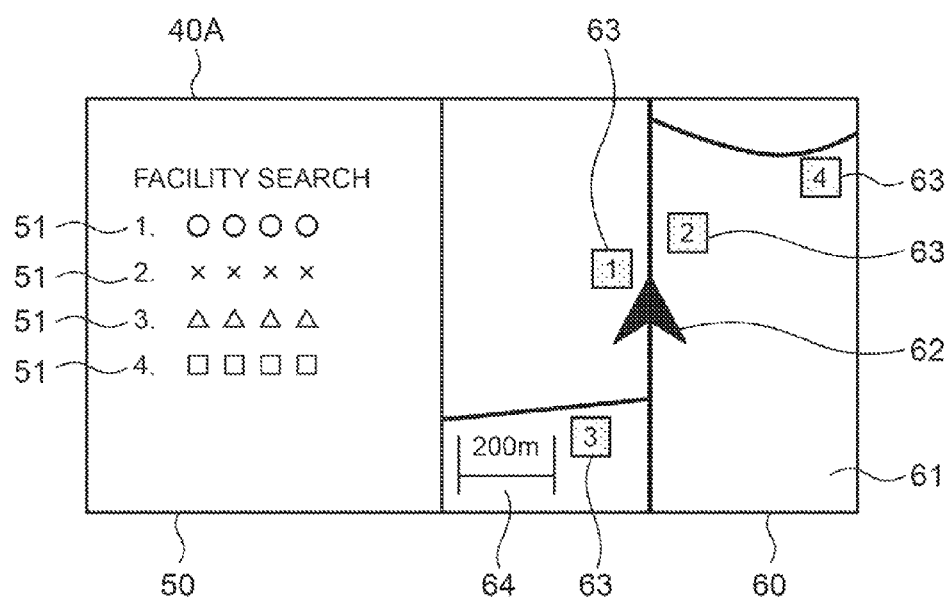
FIG. 6 is a diagram showing a facility search screen before interruption of communication.

In the facility search operation application, for example, when a user inputs "convenience store" with voices, the controller 23 transmits the input voice data to the server 10, and receives a recognition result "convenience store" which has been subjected to voice recognition processing in the server 10. The controller searches the convenience store concerned, classifies "convenience store" as the neighboring facility search and voices and/or displays "there are XX convenience stores around here". FIG. 6 shows an example of a facility search screen 40A displayed on the display unit 24 at this time.

FIG. 6 is a diagram showing the facility search screen 40A before the interruption of the communication.

The facility search screen 40A is divided into two parts, for example, and has a facility list area in which searched facilities are displayed in the form of a list, and a facility graphic area 60 in which the search facilities are graphically represented. Facility names 51 representing the names of the search facilities are displayed in the distance increasing order from the present position. The facility names 51 may be numbered in the distance increasing order from the present position.

A map 61 is displayed in the facility graphic area 60, and the present position 62 of the vehicle 2 (FIG. 1), icons 63 representing the positions of the searched facilities and a scale 64 representing the scale of the map 61 are displayed on the map 61. When the facility names are numbered in the distance increasing order from the present position 62, the same numbers as the facility names 51 may be allocated to the icons 63.

Here, for example when the communication is interrupted because the vehicle 2 enters a tunnel, the controller 23 voices and/or displays "communication is impossible at present in tunnel and will connect to the server after passing the tunnel" or the like. When the vehicle 2 gets out of the tunnel and the communication is recovered, the controller 23 voices and/or displays "the present place is moved, and so search convenience stores again" or the like, re-searches convenience information at the present position at the time point when the communication is recovered, and voices and/or displays "there are XX convenience stores around here" or the like. As described above, when a facility which is preferentially required to be in the neighborhood such as a convenience store or the like is input, the search is re-executed at a new present position after the recovery of the communication, whereby facilities which are easily reached can be displayed. An example of the facility search screen 40B at this time is shown in FIGS. 7 and 8.

Figure 7:
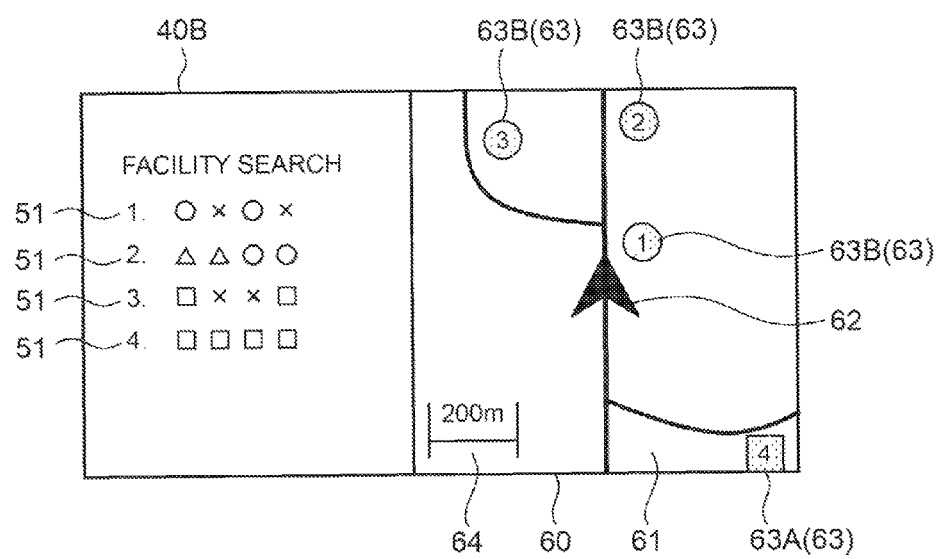
FIG. 7 is a diagram showing a facility search screen after interruption of communication.

FIG. 7 is a diagram showing a facility search screen 40B after the interruption of the communication.

The facility search screen 40B is designed to have the same construction as the facility search screen 40A shown in FIG. 6. However, the icon 63A of the search result before the communication interruption and the icon 63B of the search result after the communication recovery are displayed in different display styles (for example, different colors or different shapes) on the facility search screen 40B, thereby enhancing visibility. The icons 63 are numbered from the distance increasing order from the present position 62 after the communication recovery.

Figure 8:
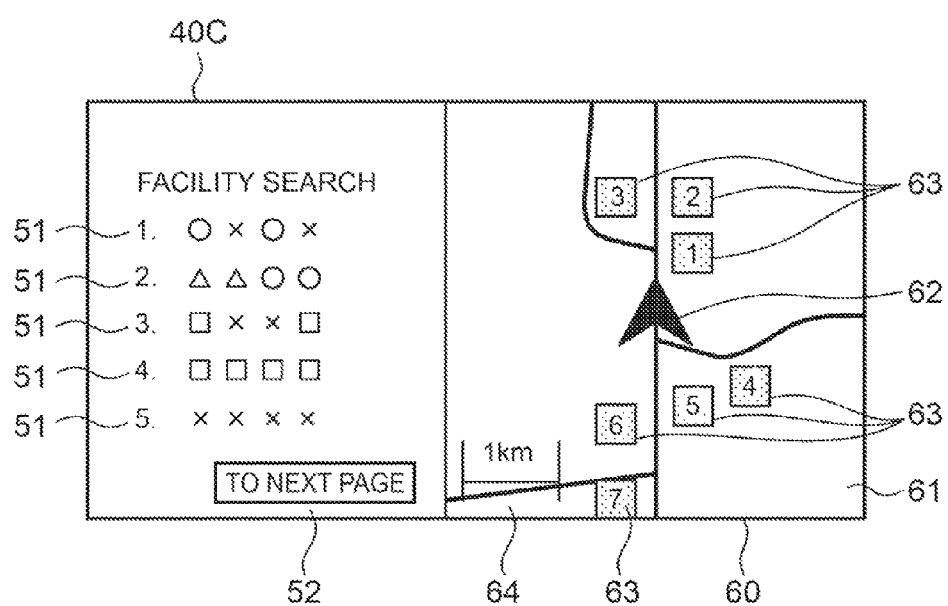
FIG. 8 is a diagram showing a facility search screen after interruption of communication.

FIG. 8 is a diagram showing a modification of FIG. 7.

A facility search screen 40C is also designed to have the same construction as the facility search screen 40A shown in FIG. 6. the scale of the map 61 can be automatically changed on the facility search screen 40C so that the icon 63A of the search result before the communication interruption and all of the icons 63B of the search result after the communication recovery can be displayed or a predetermined number of icons 63A and 63B can be displayed when the number of search results is large, thereby enhancing visibility. When all the facility names cannot be displayed in the facility list area 50 because the number of search results is large, the facility search screen 40C is designed so that the facility names 51 which cannot be displayed in the facility list area 50 are displayed on a different page(s). In this case, a button 52 which is operated to turn the page to a next page is displayed on the facility search screen 40C.

Furthermore, in the facility search operation application, when the user inputs voices of "ABC amusement park", the controller 23 transmits the input voice data to the server 10, and receives a recognition result of "ABC amusement park" which has been subjected to voice recognition processing in the server 10. The controller 23 searches information on the ABC amusement park, classifies the search for "ABC amusement park" as the specific facility search and voices and/or displays "there are XX candidates of the ABC amusement park" or the like.

For example, here, when the vehicle 2 enters a tunnel and the communication is interrupted, the controller 23 voices and/or displays "communication is impossible at present in tunnel and will connect to the server after passing the tunnel" or the like. When the vehicle 2 gets out of the tunnel and the communication is recovered, the controller 23 continues the operation of the facility search operation application. For example, the controller 23 voices and/or displays "set to destination?" or the like.

In the communication recovery processing shown in FIG. 5, when the operation of the application is continued after the recovery of the communication, there is a case where the navigation device 20 has not yet completed acquisition of the recognition result of the voice data. Therefore, after the communication recovery, the server controller 14 executes information holding/deleting processing of determining whether the processing information, that is, the type of the application as the operation target before the communication interruption, the voice data and the recognition result thereof are held or deleted Furthermore, after the communication recovery, the controller 23 of the navigation device 20 checks whether there is any voice data the recognition result of which has not yet been acquired. When the recognition result has not yet been acquired, the controller 23 executes recognition result acquisition check processing of acquiring the recognition result again.

Figure 9:
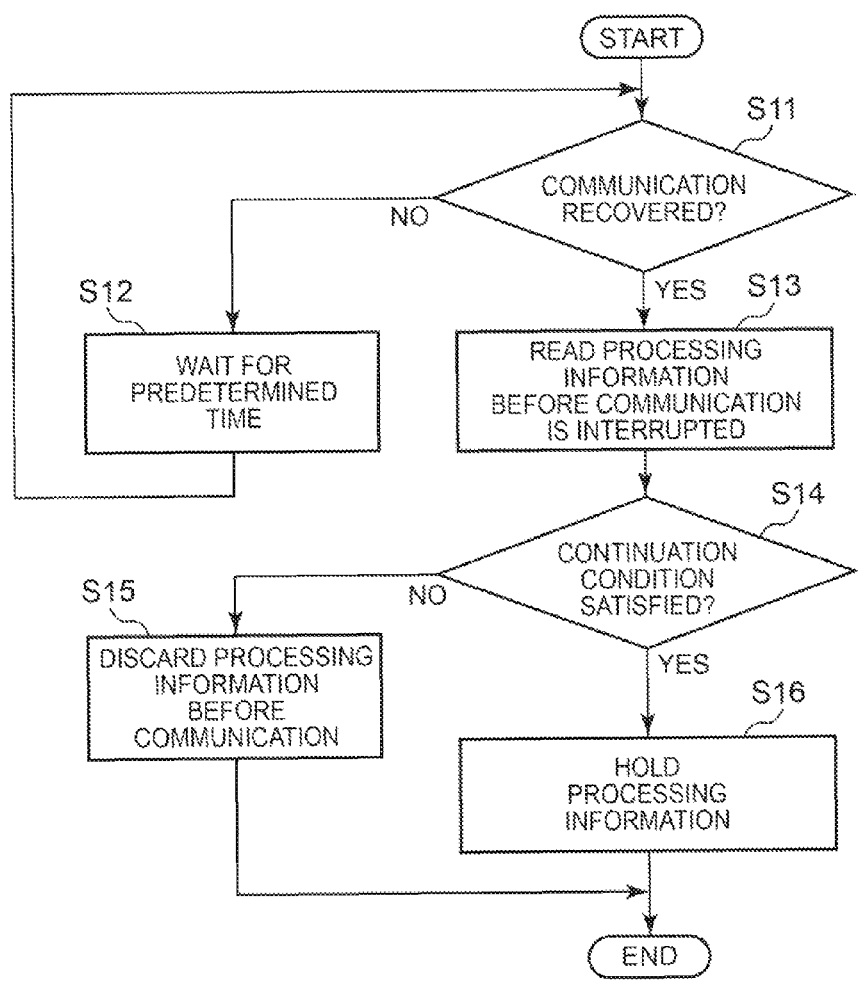
FIG. 9 is a flowchart showing information holding/deletion check processing.

FIG. 9 is a flowchart showing the information holding/deletion check processing.

The information holding/deletion check processing is executed by the server controller 14 when the communication with the navigation device 20 is interrupted before the transmission of the recognition result of the voice data to the navigation device 20 has been completed. At least a table TB1 shown in First, the server controller 14 determines whether the communication with the navigation device 20 is recovered or not (step S11).

When the communication is not recovered (step S11: No), the server controller 14 waits for a predetermined time (step S12), and shifts the processing to step S11.

When the communication is recovered (step S11: Yes), the server controller 14 reads processing information before the communication is interrupted (step S13), Here, the processing information contains the type of an application as an operation target before the interruption of the communication, voice data and the recognition result thereof. The type of the application as the operation target before the interruption of the communication is transmitted from the navigation device 20 together with the voice data, and stored in the server storage unit 13.

Subsequently, the server controller 14 refers to the table TB1, and determines whether the condition for continuing the operation of the application is satisfied, in other words, whether the voice data of the transmission-interrupted recognition result is voice data for operating the application to be continued after the recovery of the communication (step S14). In this embodiment, the server controller 14 determines in the same manner as the step S4 shown in FIG. 5.

When the condition for continuing the operation of the application (step S14: No), the server controller 14 deletes the processing information before the recovery of the communication (step S15), and finishes the processing.

When the condition for continuing the operation of the application is satisfied (step S14: Yes), the server controller 14 holds the processing information before the recovery of the communication in the server storage unit 13 (step S16), and finishes the processing. The server controller 14 deletes the thus-held processing information after receiving information representing that the acquisition of the recognition result for the voice data from the navigation device 20 is completed.

FIG. 10 is a flowchart showing the recognition result acquisition check processing.

The recognition result acquisition check processing is executed by the controller 23 after the communication is recovered (step S1 shown in FIG. 5: Yes). First, the controller 23 determines whether there is any voice data for which no recognition result has been acquired (step S21). There is not any voice data for which no recognition result has been acquired (step S21: No), the controller 23 finishes the processing.

When there is voice data for which no recognition result has been acquired (step S21: Yes), the controller 23 transmits to the server 10 a voice ID associated with the voice data for which no recognition result has been acquired (step S22). In the server 10, the server controller 14 determines whether there is the voice data allocated with the voice ID received from the navigation device 20, and requests re-transmission of the voice data concerned to the navigation device 20 when the voice data concerned does not exist.

In the navigation device 20, the controller 23 determines whether re-transmission of voice data is requested from the server 10 (step S23).

When re-transmission of voice data is not requested from the server 10 (step S23: No), the controller 23 receives the recognition result of the voice data from the server 10 (step S24), and finishes the processing. For example, when the controller 23 transmits a voice ID 4 shown in FIG. 2 to the server 10, the recognition result of the voice ID4 has been made in the server 10, and the server controller 14 transmits the recognition result of the voice ID4 to the navigation device 20. In this case, since it is unnecessary to re-transmit the voice data, the response time is shortened, and thus the amount of communications can be reduced.

On the other hand, when re-transmission of voice data is requested from the server 10 (step s23: Yes), the controller 23 transmits the voice data to the server 10 (step S25), receives the recognition result of the voice data from the server 10 (step S24) and finishes the processing. For example, when the controller 23 transmits a voice ID5 shown in FIG. 2 to the server 10, the server controller 14 requests the navigation device 20 to re-transmit voice data of the voice ID5 because the server 10 has no voice data of the voice ID5. The controller 23 transmits the voice data of the voice ID5 to the server 10. In the server 10, the voice recognition processing is executed on the received voice data of the voice ID5 by the voice recognizer 12, and the server controller 14 transmits the recognition result thereof to the navigation device 20.

As described above, this embodiment is configured to have the voice input unit 27 for inputting an operation content for operating an application, the communication unit 28 for transmitting the operation content input from the voice input unit 27 to the server 10 and receiving a server processing result as a result obtained through predetermined processing executed in the server 10, and the controller 23 for determining, in accordance with an application as an operation target associated with an operation content, whether the operation based on the operation content input before interruption of the communication with the server 10 is continued after recovery of the communication with the server 10 when the communication with the server 10 is interrupted after the operation content is input from the voice input unit 27 and before the server processing result corresponding to the operation content is received from the server 10. According to this configuration, whether the operation based on the operation content input before the interruption of the communication is continued after the recovery of the communication can be determined in accordance with the application as the operation target associated with the operation content.

Furthermore, according to the embodiment, when the application is the periphery search at the present position and the operation is an input operation of search words, the periphery search is executed while the position after the recovery of the communication is set to the present position. According to this construction, the periphery search can be performed at the new present position after the recovery of the communication, and facilities which can be more easily reached can be searched.

Still furthermore, according to the embodiment, the operation content is configured as voices. According to this configuration, whether a voice-based operation input before interruption of the communication is continued after recovery of the communication can be determined in accordance with an application as a voice-based operation target.

Still furthermore, according to the embodiment, the predetermined processing is configured as voices recognition processing of executing voice recognition on voices. According to this configuration, when the communication with the server 10 is interrupted after voices are input from the voice input unit 27 and before the recognition result of the voices concerned is received from the server 10, whether the voice-based operation input before interruption of the communication is continued after recovery of the communication with the server 10 can be determined in accordance with the application of the voice-based operation target.

Still furthermore, according to this embodiment, when the communication with the navigation device 20 is interrupted before transmission of the server processing result to the navigation device 20 is completed, the server 10 determines on the basis of the server processing result whether the operation content is an operation content for operating an application which will be continued after recovery of the communication, and holds or deletes the server processing result corresponding to the operation content in accordance with a determination result. Accordingly, a server processing result can be prevented from being deleted when the communication with the navigation device 20 is interrupted before transmission of the server processing result to the navigation device 20 is completed, and also an excessive amount of server processing results can be prevented from being held in the server 10.

The above embodiment is an example of the present invention, and various alterations may be made without departing from the subject matter of the present invention.

For example, in the above embodiment, the facility search screen is divided into two parts at the right and left sides, and the facility list area is located at the left side while the facility graphic area is located at the right side. However, the dividing direction of the facility search screen and the locating positions of the facility list area and the facility graphic area are arbitrary. Furthermore, it may be modified so that the facility search screen is not divided and the names of facilities are directly displayed on a map.

In the above embodiment, the application operated with voices is described as the device operating application, the music search operation application and the facility search operation application, but it is not limited to these applications. The continuation determining table of FIG. 4 is merely an example, and the condition for continuing an application and the processing required after recovery of the communication may be arbitrarily set.

Furthermore, in this embodiment, the server executes only the voice recognition as the predetermined processing. However, for example, information as a search target (for example, music data, facility data) may be stored as a data base (for example, music data base, facility data base) in the server storage unit, and the server may execute both of voice recognition and data base search in the search operation application (for example, the music search operation application, the facility search operation application) and transmit the recognition result of the voice data and the information corresponding to the recognition result (for example, music data, facility data) to the navigation device. When facility data are put in the server, the server executes the voice recognition processing on the voice data transmitted from the navigation device, and then further executes the facility search by using the voice recognition result as a search query (search request). Then, the server transmits the voice recognition result and the facility search result corresponding to the voice recognition result to the navigation device. That is, the communication between the server and the navigation device is not limited to the communication aiming at the voice recognition, but may be used in a case where data base search is executed in the server and the search result is used in the navigation device.

FIG. 11 is a flowchart showing the operation of the facility search operation application when not only the voice recognition, but also the facility search is executed in the server 10 until a facility name is determined will be described.

First, in the navigation device 20, the controller 23 reproduces a guide voice or displays a screen to promote the user to utter voices (step S501). When voices uttered by the user are picked up from the voice input unit (step S502), the controller 23 transmits the pickup voice data to the server 10 (step S503).

When the voice data transmitted from the navigation device 20 is received in the server 10, the server controller 14 executes the voice recognition on the voice data to convert the voice data to a string of characters (step S602). Here, a vocabulary as a recognition target is not limited to the official name of a facility name, but may contain a partial name, a popular name, a facility genre word, etc. of a facility name. For example, with respect to a facility of "Tokyo Onshi Ueno Zoo", vocabularies such as "Ueno Zoo" as a partial name, "Zoo" as a facility genre word are prepared as vocabularies of recognition targets. Since a recognition error may occur in the voice recognition, plural recognition result candidates are obtained to make a user select his/her desired recognition result candidate. The server controller 14 transmits a list of the recognition result candidates to the navigation device 20 (step S603).

In the navigation device 20, after the list of the recognition result candidates is received (sep S504), the controller 23 displays the list of the recognition result candidates on the screen (step S505), and reproduces the guide voice to promote the user to select a desired one from the list of the recognition result candidates (step s506). The selection of the user may be performed by voice recognition, but in this case, it is executed by operating a touch panel. When the touch panel operation is achieved (step S507), the controller 23 transmits the string of characters of the selected recognition result to the server 10 (step S508).

In the server 10, when the character string of the recognition result transmitted from the navigation device 20 is received (step S604), the server controller 14 searches the facility data base in the server 10 on the basis of the character string (step S605). The facility data base is put in the server 10 because of the following advantage. When the facility data base is put in the navigation device 20, the update frequency is restricted. On the other hand, when the facility data base is put in the server 10, the latest state can be easily reflected to the facility data base, so that the latest map and facility name can be searched as targets. In this case, the description will be made with respect to a case where plural facility names containing the character string of the recognition result and position information of the facility names are obtained as a search result of the facility data base. The server controller 14 transmits the search result of the facility data base to the navigation device 20 (step S606).

In the navigation device 20, when the search result transmitted from the server 10 is received (step S509), the controller 23 displays the facility name and the position thereof as the search result on the map (step S510). An operation of making the user select a desired one of the facility name candidates displayed on the screen, a route search operation will be subsequently performed although the descriptions on these subsequent operations are omitted. These operations may be selected by the user through voice recognition (steps S307, S308, S404 to S406) or the touch panel.

In the example of FIG. 11, different tasks such as voice recognition and facility search are executed in the server 10. Plural communications between the server 10 and the navigation device 20 occur in a series of operations of the facility search.

As described with respect to the example of FIG. 11, there is a case where plural communications occur until the user executes the operation associated with navigation. Furthermore, there is a case where plural types of tasks exist in the server 10 and communications are executed for plural purposes. In the example of FIG. 11, even when the communication is halfway interrupted in the application operation accompanying the series of communications described above, the communication can be recovered with keeping high usability by applying the present invention.

In the examples of FIG. 3 and FIG. 11, the description is described by using the facility search operation application as an example. However, with respect to other applications, there is also a case where plural processing is operated in the server 10 when plural communications are executed until the operation of the application is executed. For example, in the case of the music search operation application, there are executed plural communications such as (1) a user first utters an artist name, the server 10 executes voice recognition on the uttered artist name and a voice recognition result is transmitted to the navigation device, and (2) an artist name selected by a user is transmitted to the server 10, and the music data base is searched in the server 10, and the searched music data is transmitted to the navigation device 20. Furthermore, for example, in the case of an address facility operation application for searching an address as a destination in a navigation mode as an example of the device operation application, transmission of voice data to the server 10 and reception of a recognition result from the server 10 occur every time the user utters each hierarchical level of addresses such as a country name, a prefecture name (state name), a city name or the like. The present invention can be applied to any application as described above.

Furthermore, in this embodiment, the operation content transmitted from the navigation device to the server is voice data. However, when the navigation device has a voice recognizer, the recognition result of voice data may be transmitted from the navigation device to the server, and this recognition result may be subjected to data base search by using the recognition result as a search query in the server.

In the above embodiment, the operation content for operating an application is a voice input from the voice input unit. However, the present invention is not limited to this style, and for example, a string of characters or the like input from the operating unit may be used.

Furthermore, the above embodiment is premised on the construction of the navigation device shown in FIG. 1, but the navigation device is not limited to the construction of FIG. 1. For example, the communication unit is not necessarily equipped to the navigation device, and it may be equipped to a cellular phone. When the communication unit is equipped to a cellular phone, the communication between the navigation device and the cellular phone may be performed by the communication based on a broadly popular USB cable or the wireless communication based on Bluetooth (registered trademark), and the communication function of the cellular hone may be controlled from the navigation device.

Furthermore, the function executed in the cellular phone is not limited to the communication unit, but the functions of other constituent elements of the navigation device may be executed on the cellular phone. Particularly, when a high-function cellular phone (smart phone) which has been recently popular in the market is used, a part of the navigation function may be executed on the smart phone by actively using the high calculation processing performance of the smart phone.

Still furthermore, in the above embodiment, the in-vehicle mount type navigation device is used as the wireless communication terminal. However, the present invention is not limited to this style, and the present invention may be applied to portable information equipment such as a cellular phone, PDA or the like or an information processing device such as a map display device or the like.

DESCRIPTION OF REFERENCE NUMERALS 1 voice operation system (operation system)
10 server
12 server storage unit
13 voice recognizer
14 server controller
20 navigation device (wireless communication terminal)
23 controller (control means)
25 operating unit (input means)
27 voice input unit (input means)
28 communication unit (communication means)

The invention claimed is:

1. A wireless communication terminal comprising:
input means that inputs an operation content for operating an application;
a communicator that transmits the operation content input from the input means to a server, and receives a server processing result as a result of predetermined processing executed by the server;
a storage unit that stores at least one of 1) whether an operation based on the operation content input before communication with the server is continued after the communication with the server is recovered for every application, and, 2) if the application has a plurality of classifications, necessary processing after the communication with the server is recovered for every classification; and
a controller configured, when the communication with the server is interrupted after the operation content is input from the input means and before the server processing result corresponding to the operation content is received from the server, to refer the storage unit to execute at least one of i) determination, in accordance with the type of the application as an operation target based on the operation content, whether the operation based on the operation content input before communication with the server is interrupted is continued after the communication with the server is recovered, and ii) determination of the necessary processing after the communication with the server is recovered in accordance with the type of the classification based on the operation content if the application as the operation target has a plurality of classifications.

2. The wireless communication terminal according to claim 1, wherein when the application is a periphery search at a present position and the operation is an input operation of search words, the periphery search is executed while a position after the recovery of the communication is set to the present position.

3. The wireless communication terminal according to claim 1, wherein the operation content is a voice.

4. The wireless communication terminal according to claim 3, wherein the predetermined processing is voice recognition processing for executing voice recognition on the voice.

5. The wireless communication terminal according to claim 2, wherein the operation content is a voice.

6. The wireless communication terminal according to claim 1, wherein the controller is configured to determine the necessary processing after the communication with the server is recovered based on a position change of the wireless communication terminal since the interruption of the communication.

7. The wireless communication terminal according to claim 1 wherein the storage unit stores the input operation content, and
the controller is configured to send the operation content to the server according to a request from the server when the controller determines that the operation based on the operation content is continued after the communication with the server is recovered and the operation content is not stored in the server.

8. An operation system having a server for executing predetermined processing, and a wireless communication terminal that transmits an operation content for operating a plurality of types of applications to the server, receives a server processing result as a result of predetermined processing executed by the server and executes processing corresponding to the operation, wherein
the wireless communication terminal comprises:
a storage unit that stores at least one of 1) whether an operation based on the operation content input before communication with the server is continued after the communication with the server is recovered for every application, and, 2) if the application has a plurality of classifications, necessary processing after the communication with the server is recovered for every classification; and a controller configured, when the communication with the server is interrupted after the operation content is input and before a server processing result corresponding to the operation content is received from the server, to refer the storage unit to execute at least one of i) determination, in accordance with the type of the application as an operation target based on the operation content, whether the operation based on the operation content input before communication with the server is interrupted is continued after the communication with the server is recovered, and ii) determination of the necessary processing after the communication with the server is recovered in accordance with the type of the classification based on the operation content if the application as the operation target has a plurality of classifications.

9. The operation system according to claim 8, wherein when the communication with the wireless communication terminal is interrupted before transmission of the server processing result to the wireless communication terminal is completed, the server determines on the basis of the server processing result whether the operation content is the operation content for operating the application to be continued after the recovery of the communication, and holds or deletes the server processing result corresponding to the operation content in accordance with the determination result.

10. The operation system according to claim 8, wherein the operation content is a voice.

11. The operation system according to claim 10, wherein the predetermined processing is voice recognition processing for executing voice recognition on the voice.

12. The operation system according to claim 8, wherein the predetermined processing is a data base search for searching data corresponding to the operation content from a data base.

13. The operation system according to claim 9, wherein the operation content is a voice.

14. The operation system according to claim 9, wherein the predetermined processing is a data base search for searching data corresponding to the operation content from a data base.

15. The operation system according to claim 10, wherein the predetermined processing is a data base search for searching data corresponding to the operation content from a data base.

16. The operation system according to claim 11, wherein the predetermined processing is a data base search for searching data corresponding to the operation content from a data base.

17. The operation system according to claim 8, wherein the controller is configured to determine the necessary processing after the communication with the server is recovered based on a position change of the wireless communication terminal since the interruption of the communication.

18. The operation system according to claim 8, wherein the wireless communication terminal comprises:
    input means that inputs the operation content for operating the application;
    a communicator that transmits the operation content input from the input means to the server, and receives the server processing result as the result of predetermined processing executed by the server; and wherein
    the storage unit stores the input operation content, and
    the server is configured to receive the operation content from the storage unit of the wireless communication terminal through the communication and to transmit the server processing result as the result of predetermined processing to the controller when the controller determines the operation based on the operation content is continued after the communication with the server is recovered and the operation content is not stored in the server.

* * * * *